Nov. 12, 1935.  S. A. MOOG ET AL  2,020,370
WINDSHIELD HEATING APPARATUS
Filed Feb. 12, 1934
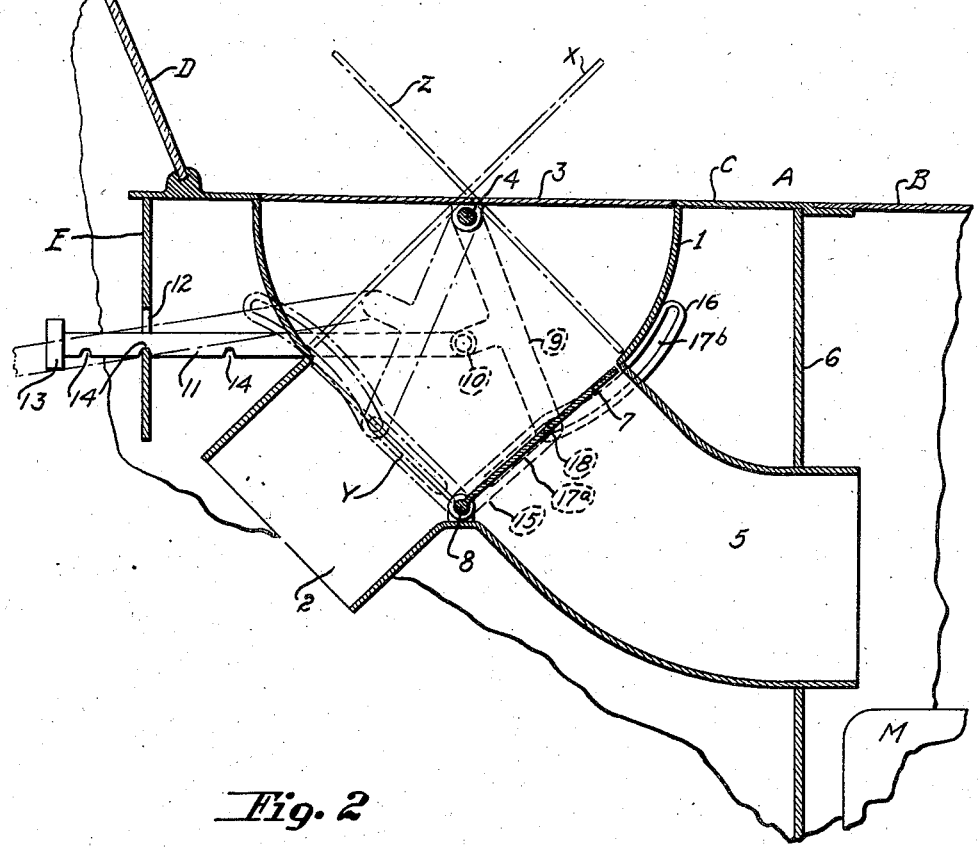
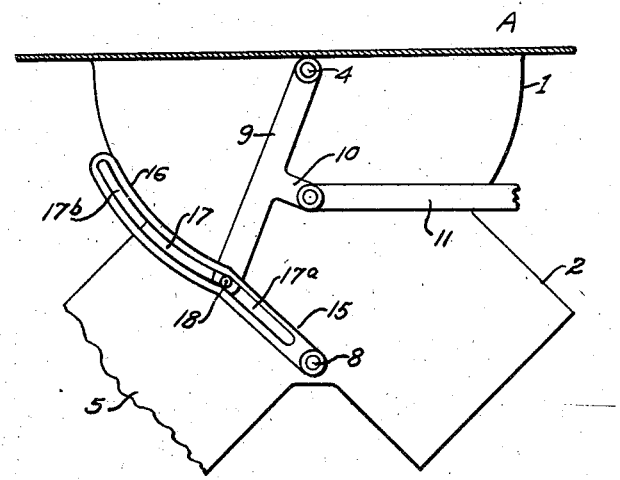
INVENTORS
C. F. PFLANZE
S. A. MOOG
BY J. S. Cook
ATTORNEY Patented Nov. 12, 1935

2,020,370

UNITED STATES PATENT OFFICE 2,020,370

WINDSHIELD HEATING APPARATUS

Shulman Alva Moog, St. Louis, and Charles F. Pflanze, Webster Groves, Mo.

Application February 12, 1934, Serial No. 710,846

3 Claims. (Cl. 20—40.5)

This invention relates generally to motor vehicles, and more specifically to an attachment for motor vehicles which is adapted to function in a manner to direct heated air produced by the operation of the internal combustion engine of the motor vehicle beneath the hood thereof against the windshield for the purpose of melting snow and ice which accumulate on the windshield.

The predominant feature of the invention resides in the fact that heat which is otherwise wasted is utilized to accomplish the purpose of the invention, and therefore ice and snow are eliminated from the windshield at no additional cost for the operation of the device, and with the help of an attachment which is very simple and inexpensively constructed.

Fig. 1 is a fragmentary, sectional view showing the improved attachment associated with parts of a motor vehicle.

Fig. 2 is a view partly in section and partly in elevation, showing the maximum for operating certain closure elements which form parts of the invention.

In the drawing, wherein is shown for the purpose of illustration, merely, one embodiment of the invention, A designates a motor vehicle which is provided with a hood B and a cowl C. The motor vehicle A includes also a windshield D and an instrument board E. Arranged immediately beneath the cowl C of the motor vehicle is an air chamber 1, the wall portions of which may be formed integrally with or attached to said cowl. Communicating with the air chamber 1 is an air duct 2 which extends downwardly and rearwardly from the air chamber 1 toward the interior of the motor vehicle. The air chamber 1 is open at the top so that air from above the cowl may pass into said air chamber, and the lower end of the air duct 2 is located within the cowl in such position that air may be discharged therefrom into the interior of the motor vehicle beneath the instrument board E.

The structure just described functions in the manner of the ordinary ventilating arrangement common to many motor vehicles, and in order to control passage of air into the air chamber 1 and through the duct 2 into the interior of the car, the structure shown in Fig. 1 includes a closure element 3 which is pivotally supported at its approximate center by a shaft 4. As will presently appear herein, the closure element 3 is capable of being adjusted to the position shown by the dotted lines designated by the reference character X, and when said closure element is so positioned and the car is in motion air will be deflected into the air chamber 1 by the upwardly extended portion of the closure element, and this air will pass through the air chamber 1 and through the duct 2 into the interior of the motor vehicle.

Communication with the interior of the air chamber 1 is a warm air conduit 5, which conduit passes through a partition wall 6 which separates the space between the cowl of the motor vehicle from the space beneath the hood thereof. The conduit 5 is open at its forward end so that air beneath the hood of the motor vehicle may pass into the conduit. Arranged at the point where the warm air conduit 5 is joined to the air chamber 1 is a secondary closure element 7, which is pivotally supported at its lower end by a rod 8. The secondary closure element 7 is intended to prevent passage of warm air from beneath the hood of the motor vehicle into the air chamber 1 when it is not desired to direct heated air against the windshield D.

Fixedly secured to the shaft 4 at a point outside of the air chamber 1 is an arm 9 which extends downwardly from said shaft 4. The arm 9 is provided with a short, rearwardly projected extension 10, and pivotally secured to this extension 10 is an operating member 11. The operating member 11 is extended through an aperture 12 formed in the instrument board E of the motor vehicle, and is provided at its rearmost end with a suitable gripping element 13 which facilitates manual operation of the operating member 11. The operating member 11 is provided with a plurality of notches 14 by which same may be locked in various positions. This is accomplished by elevating the rearmost end of the operating member so that the notches will clear the lower edge of the aperture 12 in the instrument board when movement is imparted to the operating member 11, and lowering said operating member when it has been adjusted to the desired position, so that one of said notches may engage the lower edge of the aperture 12.

Fixed to the rod 8, at a point in substantially vertical alinement with the point at which the arm 9 is fixed to the shaft 4, is an arm 15 which is provided with a curved portion 16. The arm 15 is provided with a slot 17 which extends longitudinally thereof, a portion 17a of said slot being formed in the straight portion of the arm 15, and a curved portion 17b of the slot being formed in the curved portion 16 of the arm 15. At the lower end of the arm 9 said arm is provided with a laterally extended pin 18, which is extended into the slot 17 of the arm 15, as shown most clearly in Fig. 2.

In view of the arrangement of the arms 9 and 15 as just described, it is apparent that the operating member 11 may be moved forwardly for the purpose of adjusting the closure element to the positions illustrated by the dotted lines designated by the reference character X in Fig. 1. During such movement of the operating member 11 the arm 9 will be moved forwardly and upwardly, the pin 18 moving longitudinally through the curved portion 17b of the slot 17 in the arm 15. It is apparent that such movement of the pin through the curved portion of the slot will not impart any movement to the secondary closure element 7, due to the fact that the radius of the curved portion 17b of the slot 17 is the same as the radius described by the pin 18 during such movement of the arm 9. Thus, when the operating member 11 is moved forwardly as described, the closure element 3 will be moved to a position where ventilating air will be caused to pass through the air chamber 1 and through the duct 2 into the interior of the motor vehicle.

If, however, it is desired to direct heated air against the windshield of the motor vehicle, the operating member 11 is drawn rearwardly. This will cause the pin 18 to engage the side walls of the straight portion 17a of the slot 17 in the arm 15, and as a result thereof the secondary closure element 7 will be moved rearwardly to the position shown by the dotted lines designated by the reference character Y. In this position the secondary closure element will close the upper end of the air duct 2 so as to prevent air from passing from the air chamber 1 into said air duct 2. At the same time such rearward movement of the operating member 11 will adjust the closure element 3 to the position illustrated by the dotted lines designated by the reference character Z. When the closure element 3 and the secondary closure element 7 are in the positions illustrated by the dotted lines designated by the reference characters Y and Z, heated air produced beneath the hood B of the motor vehicle by operation of the internal combustion engine M will be forced by forward movement of the motor vehicle through the hot air conduit 5 into the air chamber 1, and because of the position of the closure element 3 such heated air will be discharged from the air chamber 1 against the windshield D so that ice and snow thereon will be melted.

It is obvious, therefore, that the invention provides a common structure which is utilized in warmer weather for introducing ventilating air into the interior of the motor vehicle, and in colder weather for the purpose of discharging heated air against the windshield of the motor vehicle for the purpose of melting snow and ice which have accumulated thereon.

While the invention disclosed herein is described as being applicable particularly to motor vehicles, it is to be understood that it is not in any sense limited to automobiles, but may be applied as well to aeroplanes, street and railway cars, locomotives, etc. In short, the invention may be used in association with any carrier having a transparent wall through which the operator must look and provided with motion-initiating means through the operation of which heat is produced.

We claim:

1. In combination with a motor vehicle having a windshield and a hood beneath which an internal combustion engine is arranged, means comprising a conductor for conducting ventilating air from the exterior of the motor vehicle to the interior thereof, a conduit for heated air which communicates with the space beneath said hood and with said conductor, said conduit being so arranged that heated air passing therethrough is directed against the windshield of the motor vehicle, a single closure means adjustable to different positions for controlling passage of air through said conductor and through said conduit, and operating means for said closure means which is extended to a position convenient to the position of the operator of the motor vehicle for moving said closure means to different positions, in one of such positions said closure means being adapted to direct air against said windshield.

2. In combination with a motor vehicle having a windshield and a hood beneath which an internal combustion engine is arranged, means comprising a conductor for conducting ventilating air from the exterior of the motor vehicle to the interior thereof, an air chamber with which said conductor communicates, said air chamber being open at the exterior of the motor vehicle, a conduit for heated air which communicates with the space beneath the hood of the motor vehicle and with said air chamber, said conduit being so arranged that heated air passing therethrough is directed against the windshield, a single closure element adjustable to different positions for controlling passage of air into and out of said air chamber and directing air passing from said air chamber against said windshield, a secondary closure element for closing at different times said conductor and said conduit, and operating means for simultaneously adjusting the first-mentioned and second-mentioned closure elements.

3. In combination with a motor vehicle having a windshield and a hood beneath which an internal combustion engine is arranged, means comprising a conductor for conducting ventilating air from the exterior of the motor vehicle to the interior thereof, an air chamber with which said conductor communicates, said air chamber being open at the exterior of the motor vehicle, a conduit for heated air which communicates with the space beneath the hood of the motor vehicle and with said air chamber, said conduit being so arranged that heated air passing therethrough is directed against the windshield, a single closure element adjustable to different positions for controlling passage of air into and out of said air chamber and directing air passing from said air chamber against said windshield, a secondary closure element for closing at different times said conductor and said conduit, and operating means for simultaneously adjusting the first-mentioned and second-mentioned closure elements, said operating means being extended to a position convenient to the position of the operator of the motor vehicle.

SHULMAN ALVA MOOG.
CHARLES F. PFLANZE.